(12) United States Patent
Yamazaki et al.

(10) Patent No.: US 9,144,061 B2
(45) Date of Patent: Sep. 22, 2015

(54) RADIO COMMUNICATION SYSTEM, LOW-POWER BASE STATION, HIGH-POWER BASE STATION, RADIO TERMINAL, AND RADIO COMMUNICATION METHOD

(71) Applicant: KYOCERA Corporation, Kyoto (JP)

(72) Inventors: Chiharu Yamazaki, Kanagawa (JP); Kenta Okino, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/522,381

(22) Filed: Oct. 23, 2014

(65) Prior Publication Data

US 2015/0063303 A1    Mar. 5, 2015

Related U.S. Application Data

(63) Continuation of application No. 13/505,712, filed as application No. PCT/JP2010/069452 on Nov. 1, 2010, now Pat. No. 8,908,625.

(30) Foreign Application Priority Data

Nov. 2, 2009 (JP) .................................. 2009-251669
Apr. 15, 2010 (JP) .................................. 2010-094500

(51) Int. Cl.
*H04W 72/04* (2009.01)
*H04W 48/16* (2009.01)
(Continued)

(52) U.S. Cl.
CPC .......... *H04W 72/0406* (2013.01); *H04W 16/18* (2013.01); *H04W 36/22* (2013.01);
(Continued)

(58) Field of Classification Search
CPC .......... H04W 72/042; H04W 72/0406; H04W 48/16; H04W 16/18; H04W 36/22; H04W 36/04; H04W 36/0077; H04W 88/08; H04W 92/20; Y02B 60/50
USPC ................... 370/252–341; 455/450, 410, 524
See application file for complete search history.

(56) References Cited

U.S. PATENT DOCUMENTS 5,546,443 A      8/1996 Raith
6,226,278 B1 *   5/2001 Bursztejn et al. ............. 370/328
(Continued)

FOREIGN PATENT DOCUMENTS

CN    1528098 A    9/2004
EP    0884921 A1   12/1998
(Continued)

OTHER PUBLICATIONS

3GPP TSG-RAN WG1 #58; KYOCERA; "Uplink performance evaluation in heterogeneous deployment"; R1-093433; Shenzhen, P.R. China; Aug. 24-28, 2009.
(Continued)

*Primary Examiner* — Afsar M Qureshi
(74) *Attorney, Agent, or Firm* — Studebaker & Brackett PC (57) ABSTRACT

A radio communication system is provided with a high-power base station, a radio terminal which is located within a macro cell formed by the high-power base station, and a low-power base station which has a lower transmission output power than the high-power base station. The low-power base station sends, to the high-power base station, control information needed for the radio communication between the radio terminal and the low-power base station; the high-power base station sends, to the radio terminal, the control information received from the low-power base station; and the radio terminal performs radio communication with the low-power base station by using the control information received from the high-power base station.

3 Claims, 9 Drawing Sheets

(51) Int. Cl.

| | | |
|---|---|---|
| *H04W 16/18* | (2009.01) | |
| *H04W 36/22* | (2009.01) | |
| *H04W 36/00* | (2009.01) | |
| *H04W 36/04* | (2009.01) | |
| *H04W 88/08* | (2009.01) | |
| *H04W 92/20* | (2009.01) | |

(52) U.S. Cl.
CPC ........... *H04W 48/16* (2013.01); *H04W 72/042* (2013.01); *H04W 36/0077* (2013.01); *H04W 36/04* (2013.01); *H04W 88/08* (2013.01); *H04W 92/20* (2013.01); *Y02B 60/50* (2013.01)

(56) References Cited

U.S. PATENT DOCUMENTS

| 2003/0013452 | A1* | 1/2003 | Hunt et al. ............... 455/449 |
|---|---|---|---|
| 2009/0252077 | A1* | 10/2009 | Khandekar et al. ........ 370/312 |
| 2010/0003981 | A1 | 1/2010 | Ahluwalia |
| 2010/0113030 | A1 | 5/2010 | Kanazawa et al. |
| 2010/0173632 | A1 | 7/2010 | Kitaji |
| 2012/0202540 | A1 | 8/2012 | Lee et al. |

FOREIGN PATENT DOCUMENTS

| JP | 02-126738 A | 5/1990 |
|---|---|---|
| JP | 11-018161 | 1/1999 |
| JP | 2004-535143 A | 11/2004 |
| JP | 2007-521673 A | 8/2007 |
| JP | 2008-506280 A | 2/2008 |
| WO | 2005/015924 A1 | 2/2005 |
| WO | 2005/120094 A1 | 12/2005 |
| WO | 2008/099719 A1 | 8/2008 |

OTHER PUBLICATIONS

3GPP TSG-RAN WG1 #59; KYOCERA; "Technical Aspects of Heterogeneous Networks"; R1-094775; Jeju, Korea; Nov. 9-13, 2009.

3GPP TSG-RAN WG1 #59; KYOCERA; "Uplink Performance Evaluation of Extended PDCCH Transmission Scheme in Heterogeneous Deployment"; R1-094776; Jeju, Korea; Nov. 9-13, 2009.

3GPP TSG-RAN WG1 #58bis; NTT DOCOMO; "Inter-cell Radio Resource Management for Heterogeneous Networks"; R1-094246; Miyazaki, Japan; Oct. 12-16, 2009.

International Search Report; PCT/JP2010/069452; Dec. 7, 2010.

TSG-RAN Working Group 4 (Radio) meeting #52bis; KYOCERA; "Network Assisted Interference Coordination between Macro eNodeB and Home eNodeB in Downlink"; R4-093620; Miyazaki, Japan, Oct. 12-16, 2009.

Chinese Office Action; CN201080048539.4; Feb. 28, 2014; with concise explanation.

Japanese Office Action; JP2013-243785; Jan. 14, 2014; with concise explanation.

Japanese Office Action; JP2011-538520; Jul. 2, 2013; with concise explanation.

An Office Action; "Notice of Reasons for Rejection," issued by the Japanese Patent Office on Nov. 25, 2014, which correspond to Japanese Patent Application No. 2014-214321 and is related to U.S. Appl. No. 14/522,381; with English language statement of relevance.

* cited by examiner

RADIO COMMUNICATION SYSTEM, LOW-POWER BASE STATION, HIGH-POWER BASE STATION, RADIO TERMINAL, AND RADIO COMMUNICATION METHOD

TECHNICAL FIELD

The present invention relates to a radio communication system using different kinds of base stations together, a low-power base station, a high-power base station, a radio terminal, and a radio communication method.

BACKGROUND ART

A conventional cellular radio communication system achieves area coverage of a wide service area by dividing the wide service area into communication area units called cells, and allocating a base station to each communication area, the base station taking charge of radio communications with radio terminals within the communication area. As such a base station, used is a high-power base station (so-called a macrocell base station) having high transmission output power.

In recent years, attention have been paid to low-power base stations (so-called a picocell base station or a femtocell base station) having lower transmission output power than high-power base stations. When a low-power base station is installed in the cell of a high-power base station, the load of the high-power base station can be distributed to the low-power base station. Incidentally, a radio communication environment using a high-power base station and a low-power base station together is referred to as a heterogeneous deployment (see, for example, non-patent literature 1).

CITATION LIST

Non-Patent Literature

Non-patent literature 1: 3GPP R1-093433 "Uplink performance evaluation in heterogeneous deployment"

SUMMARY OF THE INVENTION

In the meantime, besides user data, control information is transmitted/received in radio communications between a radio terminal and a base station. Since the control information is necessary information for the radio communication between the radio terminal and the base station, the radio terminal cannot perform radio communications with the base station unless the radio terminal can receive the control information from the base station.

Under the heterogeneous deployment, a low-power base station has such small transmission output power of the control information that only a radio terminal located near the low-power base station can perform the radio communications with the low-power base station. In other words, the radio terminals enabled to perform the radio communications with the low-power base station are limited. Thus, there is a problem that a load cannot be adequately distributed among the base stations.

Under these circumstances, an objective of the present invention is to provide a radio communication system, a low-power base station, a high-power base station, a radio terminal, and a radio communication method which enable adequate load balancing among base stations under a heterogeneous deployment.

The present invention has the following features to solve the problems described above. A first feature of the present invention is summarized as follows. A radio communication system comprises: a first base station (e.g. high-power base station 200); and a second base station (e.g. low-power base station 100) capable of communicating with the first base station, wherein the second base station transmits, to the first base station, control information required for radio communications between the second base station and a radio terminal (radio terminal 300) within a communication area of the first base station, the first base station transmits the control information received from the second base station to the radio terminal, and the radio terminal performs radio communications with the second base station using the control information received from the first base station.

A second feature of the present invention relates to the first feature and is summarized as follows. The first base station is a high-power base station and the second base station is a low-power base station whose transmission output power is smaller than transmission output power of the high-power base station.

According to the above-described radio communication system, the high-power base station whose transmission output power is larger than that of the low-power base station transmits control information from the low-power base station to the radio terminal, in place of the low-power base station.

Accordingly, the radio terminal can receive the control information from the low-power base station even when the control information from the low-power base station cannot be directly received. In other words, a radio terminal other than the radio terminal near the low-power base station can perform radio communications with the low-power base station.

Thus, the radio communication system according to the characteristics of the present invention enables adequate load balancing among the base stations under the heterogeneous deployment.

A third feature of the present invention relates to the first feature and is summarized as follows. The second base station transmits timing designation information to designate timing at which the first base station transmits the control information to the radio terminal, and the first base station transmits the control information to the radio terminal at the timing designated by the timing designation information received from the second base station.

A fourth feature of the present invention relates to the first feature and is summarized as follows. The first base station notifies the second base station of a difference between timing at which the second base station transmits control information to the first base station and timing at which the first base station transmits control information to the radio terminal.

A fifth feature of the present invention relates to the first feature and is summarized as follows. The second base station transmits the first base station terminal identification information for identifying the radio terminal, and the terminal identification information is used for transmission processing of the control information to be transmitted from the first base station to the radio terminal.

A sixth feature of the present invention relates to the first feature and is summarized as follows. When the radio terminal is enabled to directly receive the control information from the second base station, the second base station switches a transmission destination of the control information from the first base station to the radio terminal, and when the radio terminal is disabled to directly receive the control information from the second base station, the second base station switches a transmission destination of the control information from the radio terminal to the first base station.

A seventh feature of the present invention relates to the first feature and is summarized as follows. The control information includes acknowledgement information indicating whether data received by the second base station from the radio terminal is successfully decoded or not.

An eighth feature of the present invention relates to the first feature and is summarized as follows. The control information includes resource assignment information indicating a radio resource assigned by the second base station to the radio terminal.

A ninth feature of the present invention relates to the first feature and is summarized as follows. The second base station performs control to switch a connection destination of the radio terminal to the first base station, when detecting the radio terminal switching an application in execution to an application required to have low RTT.

A tenth feature of the present invention relates to the first feature and is summarized as follows. When detecting that the radio terminal executes a first application required to have low RTT and a second application not required to have low RTT, the second base station performs control to switch a connection destination of the radio terminal serving for the first application to the first base station.

An eleventh feature of the present invention relates to the first feature and is summarized as follows. The first base station is a low-power base station, and the second base station is a high-power base station whose transmission output power is higher than transmission output power of the low-power base station.

A twelfth feature of the present invention is summarized as follows. A low-power base station (low-power base station 100) whose transmission output power is lower than transmission output power of a high-power base station (high-power base station 200), comprises: an inter-base station communication unit (wired communication unit 140) configured to transmit, to the high-power base station, control information required for radio communications between the low-power base station and a radio terminal (radio terminal 300) located within a communication area (macrocell C2) formed by the high-power base station; and a radio communication unit configured to perform radio communications with the radio terminal which receives the control information from the high-power base station.

A thirteenth feature of the present invention is summarized as follows. A high-power base station (high-power base station 200) whose transmission output power is higher than transmission output power of a low-power base station (low-power base station 100), comprises: an inter-base station communication unit (wired communication unit 240) configured to receive, from the low-power base station, control information required for radio communications between the low-power base station and a radio terminal (radio terminal 300) located within a communication area (macrocell C2) formed by the high-power base station; and a radio communication unit (radio communication unit 210) configured to transmit the control information received by the inter-base station communication unit to the radio terminal.

A fourteenth feature of the present invention is summarized as follows. A radio terminal (radio terminal 300) located within a communication area (macrocell C2) formed by a high-power base station (high-power base station 200) whose transmission output power is higher than transmission output power of a low-power base station (low-power base station 100), comprises: a radio communication unit (radio communication unit 310) configured to receive control information required for radio communications between the radio terminal and the low-power base station from the high-power base station, and configured to perform radio communications with the low-power base station using the received control information.

A fifteenth feature of the present invention is summarized as follows. A radio communication method comprises the steps of: transmitting control information required for a radio communication between a second base station and a radio terminal located within a communication area formed by a first base station from the second base station to the first base station; transmitting the control information received by the first base station from the second base station to the radio terminal; and performing radio communications with the second base station by the radio terminal using the control information received from the first base station.

The present invention can provide a radio communication system, a low-power base station, a high-power base station, a radio terminal, and a radio communication method which enable adequate load balancing among base stations under a heterogeneous deployment.

DESCRIPTION OF THE EMBODIMENT

Hereinafter, embodiments of the present invention are described below by referring to the drawings. In the following description of the drawings in each embodiment, same or similar reference numerals are given to denote same or similar portions.

First Embodiment

In a first embodiment, the description is sequentially given of (1) Schematic Configuration of Radio Communication System, (2) Detailed Configuration of Radio Communication System, (3) Operation of Radio Communication System, and (4) Effects of Embodiments.

(1) Schematic Configuration of Radio Communication System

Figure 1:
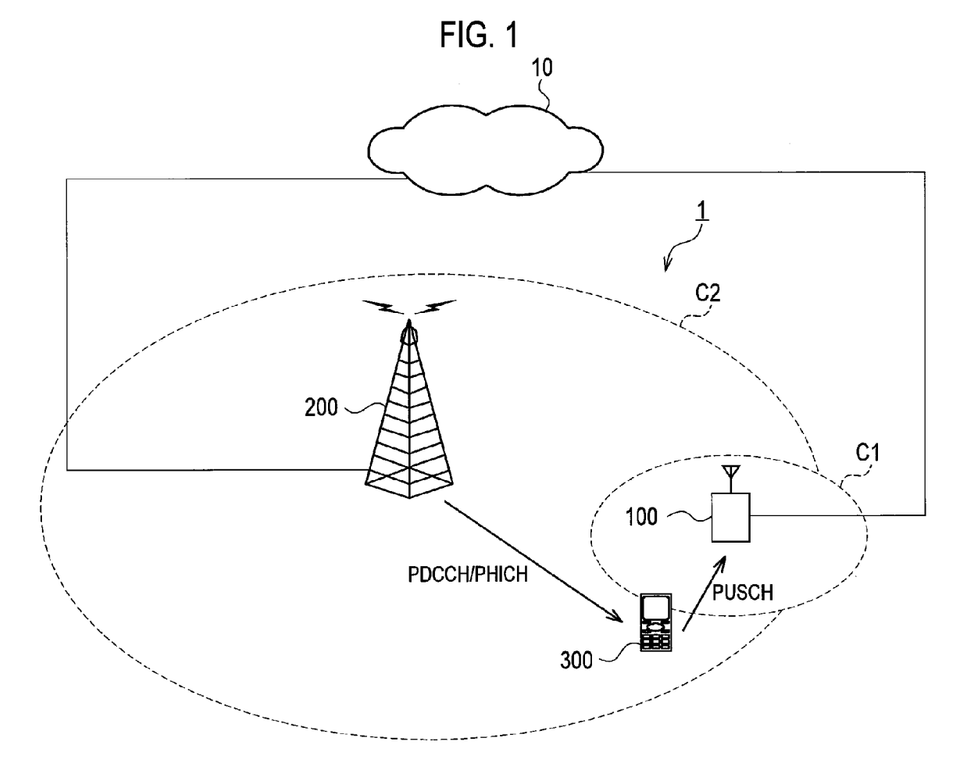
FIG. 1 is an entire schematic configuration diagram of a radio communication system according to a first embodiment of the invention.

FIG. 1 is an entire schematic configuration diagram of a radio communication system 1 according to the first embodiment. The radio communication system 1 has the configuration based on, for example, LTE (Long Term Evolution) Release 9 which is the 3.9th generation (3.9G) cellular radio communication system or the configuration based on LTE-Advanced which is positioned as the 4th generation (4G) cellular communication system. Hereinafter, the LTE Release 9 and LTE-Advanced are collectively referred to as LTE.

The radio communication system 1 has a low-power base station (a low-output power base station or a small-output base station) 100, a high-power base station (a high-output power base station or a large-output base station) 200, and a radio terminal 300. The low-power base station 100 is a base station whose transmission output power is lower than that of the high-power base station 200. The low-power base station 100 is installed within a macrocell C2 with a primary objective of distributing the load of the high-power base station 200. Note that in the LTE, a base station is referred to as eNB and a radio terminal is referred to as UE (User Equipment).

In the first embodiment, the low-power base station 100 is a picocell base station forming a picocell C1 which is a communication area with a radius on the order of several dozen to 100 meters. Note that, the picocell is also referred to as a hot zone. Also, the high-power base station 200 is a macrocell base station forming a macrocell C2 which is a communication area with a radius on the order of several hundred meters to several kilometers. In this manner, the heterogeneous deployment is provided in the radio communication system 1.

The radio terminal 300 is connected to the low-power base station 100. In other words, in the first embodiment, the low-power base station 100 is a connection destination base station (a serving base station) of the radio terminal 300.

In general, a base station transmitting a radio signal whose received power in the radio terminal 300 is the highest is selected as a connection destination of the radio terminal 300. The first embodiment does not employ an approach to select a connection destination based on such received power (hereafter, RP criterion), but employs an approach to select a base station whose propagation loss with the radio terminal 300 is the smallest as a connection destination base station (a serving base station) of the radio terminal 300 (hereinafter, PL criterion). Although the picocell C1 is illustrated as a communication area based on the RP criterion in FIG. 1, the picocell C1 is logically expanded from that in FIG. 1 based on the PL criterion. The PL criterion can enhance the uplink communication performance at maximum unlike the PR criterion.

The low-power base station 100 and the high-power base station 200 are connected to a core network 10 being a wired communication network. The core network 10 is provided by a carrier and is configured of an unillustrated router or the like. The low-power base station 100 and the high-power base station 200 can directly perform a base station communication via a connection which is a logical communication path established in the core network 10. The connection is referred to as an X2 interface in the LTE.

Figure 2:
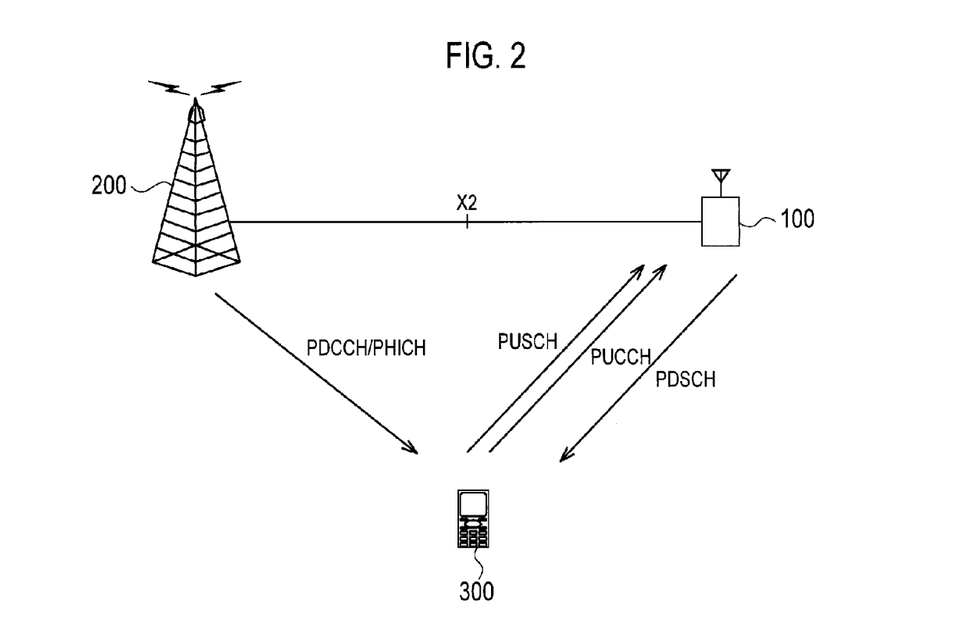
FIG. 2 is a drawing for illustrating a communication channel relating to a radio terminal according to the first embodiment of the invention.

FIG. 2 is a drawing for illustrating a communication channel relating to the radio terminal 300.

A physical uplink control channel (PUCCH) in which control information is transmitted and a physical uplink shared channel (PUSCH) in which user data is transmitted are established in an uplink between the radio terminal 300 and the low-power base station 100. A physical downlink shared channel (PDSCH) in which user data is transmitted is established in the downlink between the radio terminal 300 and the low-power base station 100. A physical downlink control channel (PDCCH) in which control information is transmitted and a hybrid automatic repeat request (HARQ) indicator channel (PHICH) are established in a downlink between the radio terminal 300 and the high-power base station 200. The HARQ is described later in detail.

As described above, the radio terminal 300 according to the first embodiment transmits/receives uplink/downlink user data to/from the low-power base station 100 via PUSCH and PUSCH, and transmits control information for controlling the downlink radio communication to the low-power base station 100 via PUCCH, and receives control information for controlling the uplink radio communication from the high-power base station 200 via PDCCH.

To realize such a mechanism, the low-power base station 100, the high-power base station 200, and the radio terminal 300 operate as follows. Specifically, the low-power base station 100 transmits control information required for the uplink radio communications between the radio terminal 300 and the low-power base station 100 to the high-power base station 200 via the X2 interface. The high-power base station 200 transmits the control information received from the low-power base station 100 to the radio terminal 300 via PDCCH or PHICH. The radio terminal 300 transmits the uplink user data to the low-power base station 100 via PUSCH using the control information received from the high-power base station 200.

As described above, the high-power base station 200 whose transmission output power is higher than that of the low-power base station 100 transmits the control information from the low-power base station 100 to the radio terminal 300, in place of the low-power base station 100. Accordingly, the radio terminal 300 can receive the control information from the low-power base station 100 even when the control information from the low-power base station 100 cannot be directly received. Note that, the downlink user data transmitted via PDSCH can be directly received by the radio terminal 300 from the low-power base station 100 by adaptive modulation and coding, HARQ, or inter-cell interference (ICIC). In the following, the description is mainly given of a sequence of operations relating to the PUSCH transmission.

(2) Detailed Configuration of Radio Communication System

Hereinafter, the configuration of the radio communication system 1 is described. Specifically, the descriptions are given of (2.1) Configuration of the low-power base station, (2.2) Configuration of the high-power base station, and (2.3) Configuration of the radio terminal. However, the description is only given of the configurations relating to the present invention.

(2.1) Configuration of the Low-Power Base Station

Figure 3:
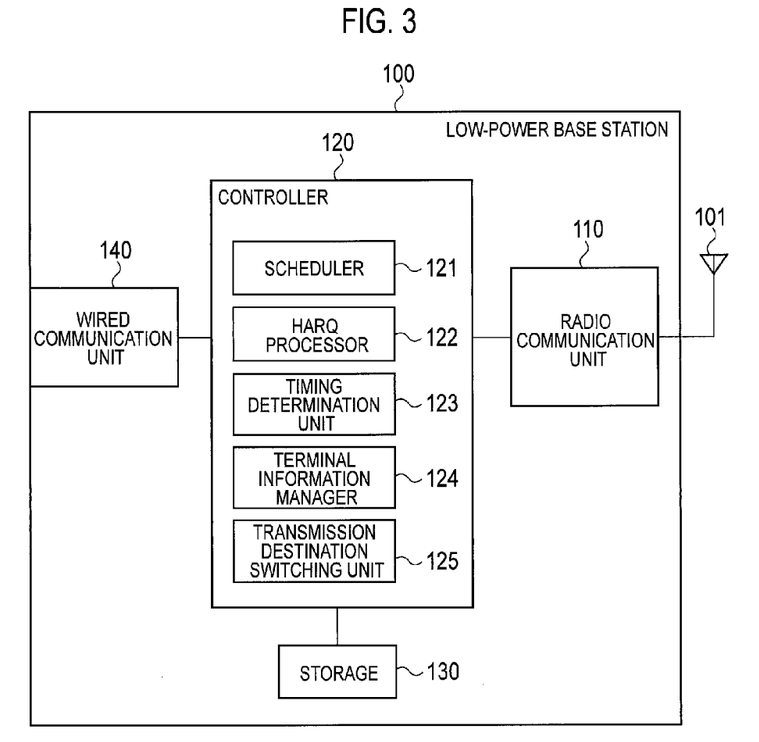
FIG. 3 is a block diagram illustrating the configuration of a low-power base station according to the first embodiment of the invention.

FIG. 3 is a block diagram illustrating the configuration of the low-power base station 100. As illustrated in FIG. 3, the low-power base station 100 has an antenna unit 101, a radio communication unit 110, a controller 120, a storage 130, and a wired communication unit 140.

The radio communication unit 110 is configured using, for example, a radio frequency (RF) circuit and a base band (BB) circuit, and transmits/receives a radio signal to/from the radio terminal 300. Also, the radio communication unit 110 modulates the transmission signal and demodulates the received signal.

The controller 120 is configured using, for example, CPU and controls various kinds of functions included in the low-power base station 100. The storage 130 is configured using, for example, a memory, and stores various kinds of information to be used for control of the low-power base station 100 and the like. The wired communication unit 140 communicates with another device via the core network 10.

In the first embodiment, the wired communication unit 140 is equivalent to an inter-base station communication unit, which transmits control information required for the radio communications between the radio terminal 300 and the low-power base station 100. The radio communication unit 110 performs radio communications with the radio terminal receiving the control information from the high-power base station 200.

The controller 120 has a scheduler 121, a HARQ processor 122, a timing determination unit 123, a terminal information manager 124, and a transmission destination switching unit 125.

The scheduler 121 assigns respective radio resources of PUSCH and PUSCH to the radio terminal 300 according to a scheduling algorism such as a proportional fairness algorism. The radio resource is defined by a combination of a frequency and time. The scheduler 121 creates information indicating the radio resource assigned to the radio terminal 300 as scheduling information. The scheduling information is one kind of the control information and is equivalent to the resource assignment information.

The HARQ processor 122 performs retransmission control according to HARQ. In the uplink communication, the HARQ processor 122 decodes the data received from the radio terminal 300 via PUSCH and creates Ack when the decoding is successful or Nack when the decoding is unsuccessful. When the decoding is unsuccessful, the HARQ processor 122 holds the unsuccessfully-decoded data without discarding the data and combines the held data with data retransmitted from the radio terminal 300 via PUSCH. In the following description, Ack or Nack is referred to as Ack/Nack information. The Ack/Nack information is one kind of control information and is equivalent to acknowledgement information.

The wired communication unit 140 transmits the scheduling information created by the scheduler 121 and the Ack/Nack information created by the HARQ processor 122 to the high-power base station 200 via the X2 interface.

The timing determination unit 123 determines timing (hereinafter, control information transmission timing) at which the high-power base station 200 transmits the control information (the scheduling information, the Ack/Nack information) to the radio terminal 300. Specifically, the timing determination unit 123 grasps a delay time in the X2 interface with the high-power base station 200 in advance and determines as control information transmitting timing a timing obtained by adding a predetermined time to the delay time. Since the radio terminal 300 performs transmission upon lapse of a specified time (for example, 4 sub-frames) after the reception of the control information, it is guaranteed for the low-power base station 100 is guaranteed to perform the reception upon lapse of the specified time after the control information transmission timing.

Note that when there is jitter of the delay time in the X2 interface with the high-power base station 200, the timing determination unit 123 may periodically measure the delay time and determine control information transmission timing based on the measured value. Instead, the timing determination unit 123 may determine the control information transmission timing based on an upper-limit value (an upper limit value defined by the specifications) of the delay time in the X2 interface with the high-power base station 200.

The timing determination unit 123 creates timing designation information indicating the determined control information transmission timing. The wired communication unit 140 transmits the scheduling information and/or the Ack/Nack information to the high-power base station 200 and transmits the timing designation information created by the timing determination unit 123 to the high-power base station 200 via the X2 interface.

The terminal information manager 124 manages information relating to the radio terminal 300. Specifically, the terminal information manager 124 stores the terminal identification information to identify the radio terminal 300 in the storage 130. Here, the terminal identification information is used for decoding the control information transmitted to the radio terminal 300. For this reason, the wired communication unit 140 transmits the terminal identification information managed by the terminal information manager 124 to the high-power base station 200 via the X2 interface in addition to the scheduling information and/or the Ack/Nack information and the timing designation information. Transmission of these kinds of information is not limited to transmission using a single message including all of them, but may be carried out by using multiple messages.

Note that, the timing designation information is not limited to absolute designation which designates a frame number or sub-frame number exactly indicating the control information transmission timing, but may be relative designation which instructs the high-power base station 200 to transmit control information certain sub-frames after the high-power base station 200 receives the control information.

The transmission destination switching unit 125 switches a transmission destination of the control information from the high-power base station 200 to the radio terminal 300 when the radio terminal 300 is enabled to directly receive the control information from the low-power base station 100. Also, the transmission destination switching unit 125 switches a transmission destination of the control information from the radio terminal 300 to the high-power base station 200 when the radio terminal 300 is disabled to directly receive the control information from the low-power base station 100. Here, whether or not the radio terminal 300 can directly receive the control information from the low-power base station 100 can be determined based on a channel quality reported from the radio terminal 300. The channel quality information indicates a value indicating received power of a radio signal (specifically, a reference signal) received by the radio terminal 300 from the low-power base station 100 or a value indicating an SINR of the radio signal.

(2.2) Configuration of the High-Power Base Station

Figure 4:
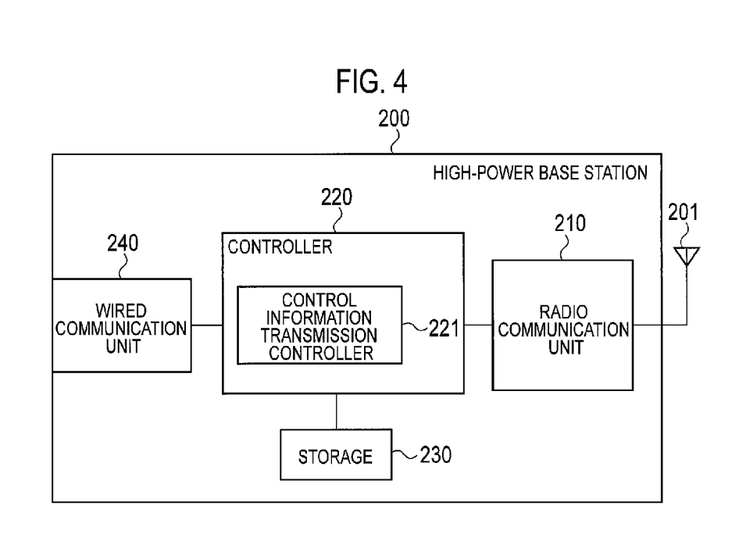
FIG. 4 is a block diagram illustrating the configuration of a high-power base station according to the first embodiment of the invention.

FIG. 4 is a block diagram illustrating the configuration of the high-power base station 200. As illustrated in FIG. 4, the high-power base station 200 has an antenna unit 201, a radio communication unit 210, a controller 220, a storage 230, and a wired communication unit 240.

The radio communication unit 210 is configured using, for example, an RF circuit and a BB circuit, and transmits control information to the radio terminal 300. Also, the radio communication unit 210 encodes and modulates a transmission signal and demodulates and decodes a received signal.

The controller 220 is configured using, for example, a CPU and controls various kinds of functions included in the high-power base station 200. The storage 230 is configured using, for example, a memory, and stores various kinds of information to be used for control on the high-power base station 200 and the like.

In the first embodiment, the wired communication unit 240 is equivalent to inter-base station communication unit configured to perform an inter-base station communication with the low-power base station 100 using the X2 interface. The wired communication unit 240 receives the control information required for the radio communications between the radio terminal 300 located within a macrocell C2 formed by the high-power base station 200 and the low-power base station 100 from the low-power base station. The radio communication unit 210 transmits the control information received by the wired communication unit 240 to the radio terminal 300 via PDCCH.

The controller 220 has a control information transmission controller 221 configured to control transmission of the control information to the radio terminal 300.

The control information transmission controller 221 transmits the control information to the radio terminal 300 at the timing (the sub-frames) designated by the timing designation information received from the low-power base station 100 via the X2 interface. For this reason, the control information transmission controller 221 temporarily stores the control information in the storage 230 until the timing designated by the timing designation information.

The control information transmission controller 221 assigns the control information transmitted to the radio terminal 300 as PDCCH and/or PHICH using the terminal identification information received from the low-power base station 100 via the X2 interface. Here, the terminal identification information is used for a resource (time/frequency) assignment of scramble and PDCCH/PHICH. In other words, the transmission processing using the terminal identification information means the resource assignment of the scramble and PDCCH/PHICH in the first embodiment.

The control information transmission controller 221 transmits the scheduling information out of the control information to the radio terminal 300 via PDCCH. On the other hand, the control information transmission controller 221 transmits the Ack/Nack information out of the control information to the radio terminal 300 via PHICH.

(2.3) Configuration of the Radio Terminal

Figure 5:
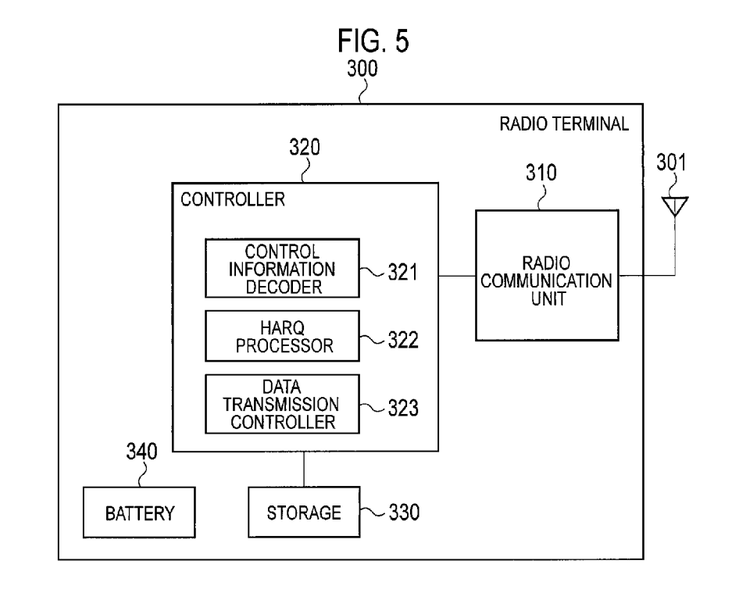
FIG. 5 is a block diagram illustrating the configuration of a radio terminal according to the first embodiment of the invention.

FIG. 5 is a block diagram illustrating the configuration of the radio terminal 300. As illustrated in FIG. 5, the radio terminal 300 has an antenna unit 301, a radio communication unit 310, a controller 320, a storage 330, and a battery 340.

The radio communication unit 310 is configured using, for example, an RF circuit and a BB circuit, and transmits/receives a radio signal. Also, the radio communication unit 310 encodes and modulates a transmission signal and demodulates and decodes a received signal.

In the first embodiment, the radio communication unit 310 receives the control information required for the radio communications between the radio terminal 300 and the low-power base station 100 from the high-power base station 200, and performs radio communications with the low-power base station 100 using the received control information.

The controller 320 is configured using, for example, a CPU and controls various kinds of functions included in the radio terminal 300. The storage 330 is configured using, for example, a memory, and stores various kinds of information to be used for control on the radio terminal 300 and the like. The battery 340 stores power supplied to each block of the radio terminal 300.

The controller 320 has a control information decoder 321, a HARQ processor 322, and a data transmission controller 323.

The storage 330 stores the terminal identification information of the radio terminal 300 in advance, and the control information decoder 321 decodes the control information received by the radio communication unit 310 using the terminal identification information.

The HARQ processor 322 performs retransmission control according to HARQ. The HARQ processor 122 repeats retransmission according to the Ack/Nack information for one HARQ process. The retransmission processing includes processing of error correction decoding (such as turbo coding). In the LTE, multiple HARQ processes can be executed in parallel. In other words, a subsequent HARQ process can be started before one HARQ process is completed.

The data transmission controller 323 controls transmission of user data to the low-power base station 100. The data transmission controller 323 performs data transmission using the radio resource of PUSCH indicated by the scheduling information.

(3) Operation of the Radio Communication System

Hereinafter, the flow of an operation of the radio communication system 1 according to PUSCH transmission is described by referring to FIG. 6.

At step S101, the radio communication unit 310 of the radio terminal 300 transmits a sounding reference signal (SRS) and a buffer status report (BSR) to the low-power base station 100. The communication unit 110 of the low-power base station 100 receives the SRS and BSR. The SRS is used for measuring an uplink channel quality between the radio terminal 300 and the low-power base station 100 using the low-power base station 100. The BSR is a message to report an amount of uplink user data (hereinafter, uplink buffer amount) existing in buffer space of the storage 330 of the radio terminal 300. A large uplink buffer amount means that user data to be transmitted to the low-power base station 100 is large. Thus, a radio resource has to be preferentially assigned to the low-power base station 100.

At step S102, the scheduler 121 of the low-power base station 100 performs scheduling which is processing of assigning the radio resource to the radio terminal 300 according to a scheduling algorithm such as proportional fairness in consideration of the uplink buffer amount indicated by the BSR.

At step S103, the wired communication unit 140 of the high-power base station 200 transmits the scheduling information created by the scheduler 121 to the high-power base station 200 via the X2 interface. At that time, the wired communication unit 140 also transmits the timing designation information and the terminal identification information to the high-power base station 200. The wired communication unit 240 of the high-power base station 200 receives the scheduling information, the timing designation information, and the terminal identification information.

At step S104, the radio communication unit 210 of the high-power base station 200 transmits the scheduling information to the radio terminal 300 via PDCCH. The radio communication unit 310 of the radio terminal 300 receives the scheduling information via PDCCH.

At step S105 that is the specified time (4 sub-frames) after the scheduling information, the radio communication unit 310 of the radio terminal 300 transmits user data to the low-power base station 100 via PUSCH by using the radio resource indicated by the scheduling information. The radio communication unit 110 of the low-power base station 100 receives the user data via PUSCH.

At step S106, the HARQ processor 122 of the low-power base station 100 decodes the user data received by the radio communication unit 110. At that time, the stored data is combined by the HARQ processor 122 as needed.

At step S107, the wired communication unit 140 of the high-power base station 100 transmits the Ack/Nack information created by the HARQ processor 122 to the high-power base station 200 via the X2 interface. At that time, the wired communication unit 140 also transmits the timing designation information and the terminal identification information to the high-power base station 200. The wired communication unit 240 of the high-power base station 200 receives the Ack/Nack information, the timing designation information, and the terminal identification information via the X2 interface.

At step S108, the radio communication unit 210 of the high-power base station 200 transmits the Ack/Nack information to the radio terminal 300 via PHICH. The radio communication unit 310 of the radio terminal 300 receives the Ack/Nack information via PHICH.

At step S109, when the retransmission is needed, such as when Nack is received, the radio communication unit 310 of the radio terminal 300 transmits retransmission data corresponding to the Nack to the low-power base station 100 via PUSCH.

Figure 6:
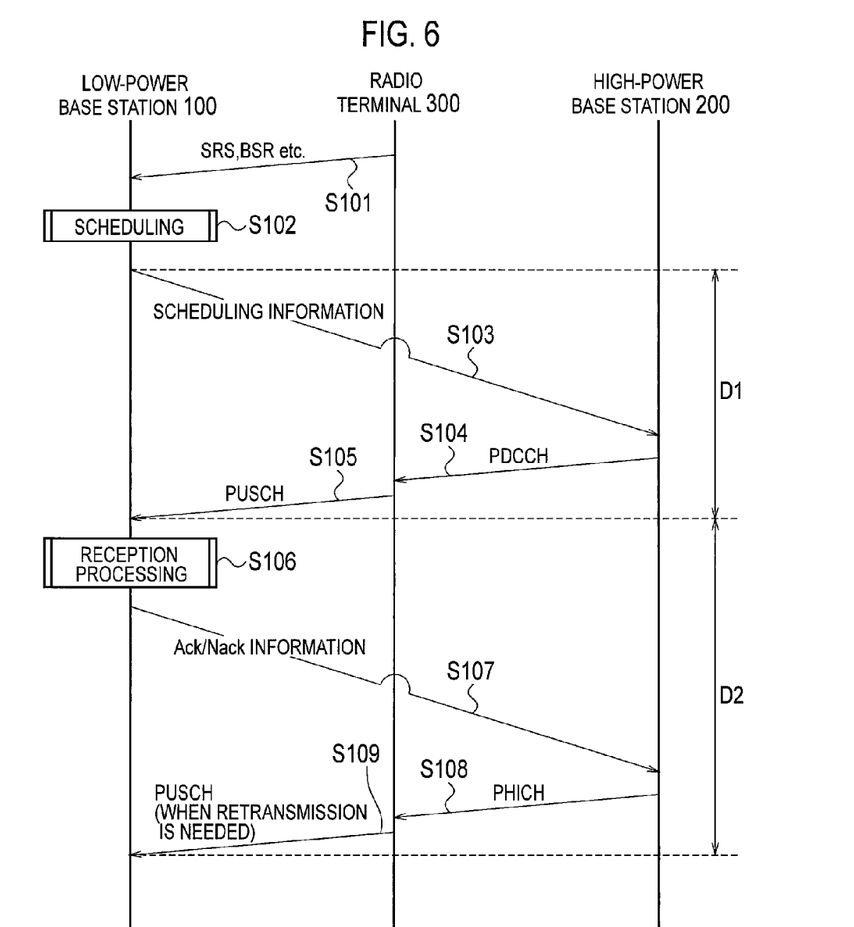
FIG. 6 is an operational sequence diagram illustrating a flow of an operation with regard to PUSCH transmission of the radio communication system according to the first embodiment of the invention.

Note that although the scheduling delay as illustrated by D1 in FIG. 6 and the HARQ delay as illustrated by D2 in FIG. 6 are caused due to the delay time in the X2 interface, the deterioration of throughput can be avoided by increasing the number of HARQ processes.

(4) Effects of Embodiment

As described above, the radio communication system 1 enable adequate load balancing among base stations under the heterogeneous deployment.

Also, in the radio communication system 1, the high-power base station 200 transmits control information to the radio terminal 300 at the timing designated by the timing designation information received from the low-power base station 100.

Accordingly, even when the delay in the X2 interface changes, the high-power base station 200 can wait for the transmission of the control information until the designated timing and can absorb the jitter of the delay in the X2 interface, so that the low-power base station 100 can perform the radio communications with the radio terminal 300 at predetermined timing.

In the radio communication system 1, the low-power base station 100 transmits the terminal identification information to identify the radio terminal 300 to the high-power base station 200, and the terminal identification information is used for decoding the control information transmitted from the high-power base station 200 to the radio terminal 300.

Accordingly, even when the high-power base station 200 different from the low-power base station 100 being an original transmitter transmits the control information, the radio terminal 300 can normally decode the control information received from the high-power base station 200.

In the radio communication system 1, the low-power base station 100 switches a transmission destination of the control information from the high-power base station 200 to the radio terminal 300 when the radio terminal 300 is enabled to directly receive the control information from the low-power base station 100. Also, the low-power base station 100 switches a transmission destination of the control information from the radio terminal 300 to the high-power base station 200 when the radio terminal 300 is disabled to directly receive the control information from the low-power base station 100.

Accordingly, a path via the high-power base station 200 and a path not via the high-power base station 200 can be selectively properly used.

In the radio communication system 1, the control information includes Ack/Nack indicating whether the data received by the low-power base station 100 from the radio terminal is successfully decoded or not.

Accordingly, even when the radio terminal 300 cannot directly receive the control information from the low-power base station 100, the HARQ in the uplink can be functioned.

In the radio communication system 1, the control information includes the resource assignment information indicating the radio resource assigned by the low-power base station 100 to the radio terminal 300.

Accordingly, even when the radio terminal 300 cannot directly receive the control information from the low-power base station 100, the scheduling in the uplink and downlink can be functioned.

Second Embodiment

In the above-described first embodiment, the high-power base station 200 transmits the control information from the low-power base station 100 to the radio terminal 300 in place of the low-power base station 100. However, in consideration of the delay in the X2 interface, this method is not necessarily uniformly applied to all the radio terminals 300 having difficulty in directly receiving PDCCH from the low-power base station 100 among the multiple radio terminals 300 connected to the low-power base station 100.

In a second embodiment, among radio terminals 300 connected to the low-power base station 100 and having difficulty in directly receiving PDCCH from the low-power base station 100, a radio terminal 300 using an application type (traffic type) required to have a low-RTT (Round Trip Time) is controlled for handover to switch a connection destination from a low-power base station 100 to a high-power base station 200. Note that the following second embodiment is provided only for portions different from those of the first embodiment while omitting the duplicated description.

Figure 7:
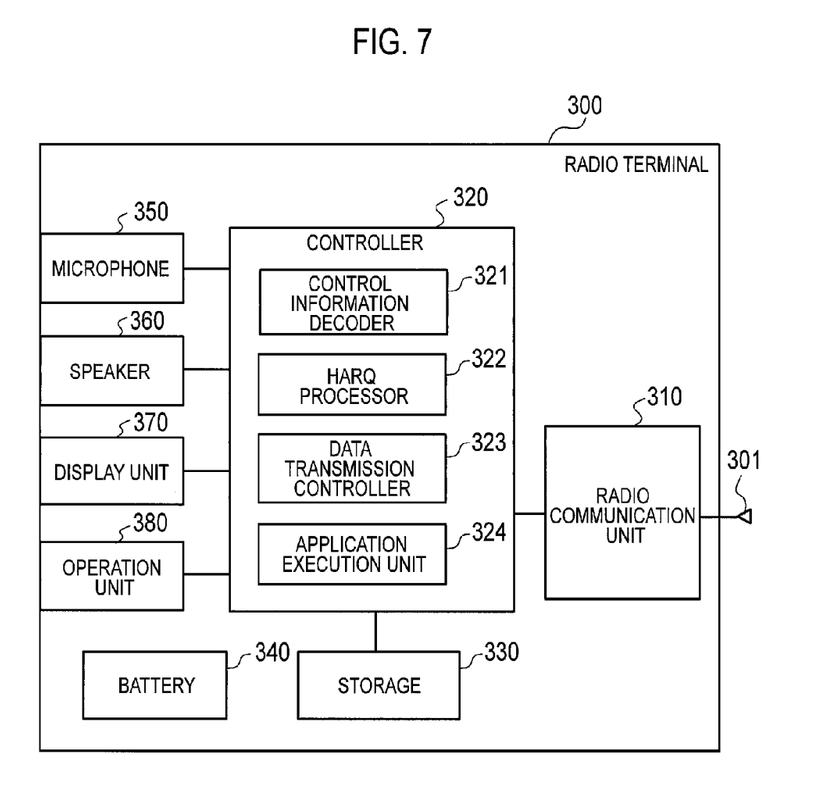
FIG. 7 is a block diagram illustrating the configuration of a radio terminal according to a second embodiment of the invention.

FIG. 7 is a block diagram illustrating a configuration of the radio terminal 300 according to the second embodiment.

As illustrated in FIG. 7, the radio terminal 300 has a microphone 350, a speaker 360, a display unit 370, an operation unit 380, and an application execution unit 324. The microphone 350 converts sound into a sound signal and inputs the converted sound signal to the controller 320. The speaker 360 converts the sound signal inputted from the controller 320 to sound and outputs the converted sound. The display unit 370 displays an image according to an image signal inputted from the controller 320. The operation unit 380 receives an input operation from a user and inputs an operation signal according to the input operation to the controller 320.

The application execution unit 324 executes an application based on the operation signal from the operation unit 380. For example, the application includes here a voice call application, an interactive game application, a file download application, a web browsing application, or a mail application. A real-time application such as the voice call application or the interactive game application is an application required to have low RTT. A non-real-time application such as the file download application, the web browsing application, or the mail application is an application not required to have low RTT. In the second embodiment, it is assumed that an application executed by the application execution unit 324 is switched from the non-real time application to the real-time application.

In the second embodiment, the radio communication unit 310 transmits QoS (such as degree of low RTT requirement)

information indicating QoS of an application executed by the application execution unit 324.

Figure 8:
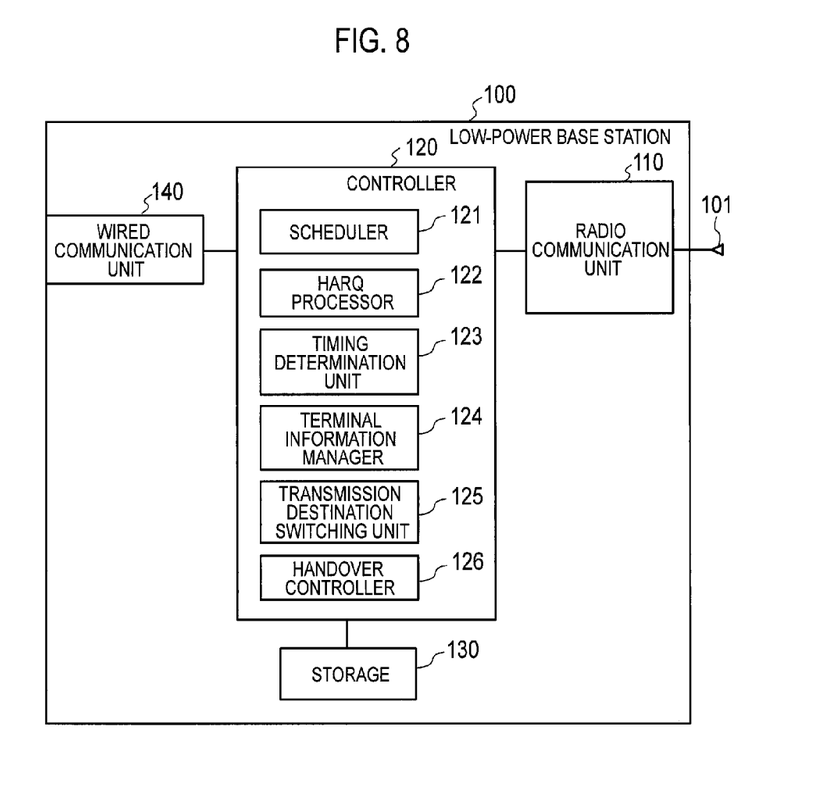
FIG. 8 is a block diagram illustrating the configuration of a low-power base station according to the second embodiment of the invention.

FIG. 8 is a block diagram illustrating the configuration of a low-power base station 100 according to the second embodiment.

As illustrated in FIG. 8, the low-power base station 100 has a handover controller 126 in addition to the configuration described in the first embodiment. The handover controller 126 controls handover of the radio terminal 300 based on the QoS information included in BSR received by the radio communication unit 110 from the radio terminal 300. In the second embodiment, the handover controller 126 performs control to switch the connection destination of the radio terminal 300 to the high-power base station 200 when detecting that the application executed in the radio terminal 300 is switched to the real-time application.

Figure 9:
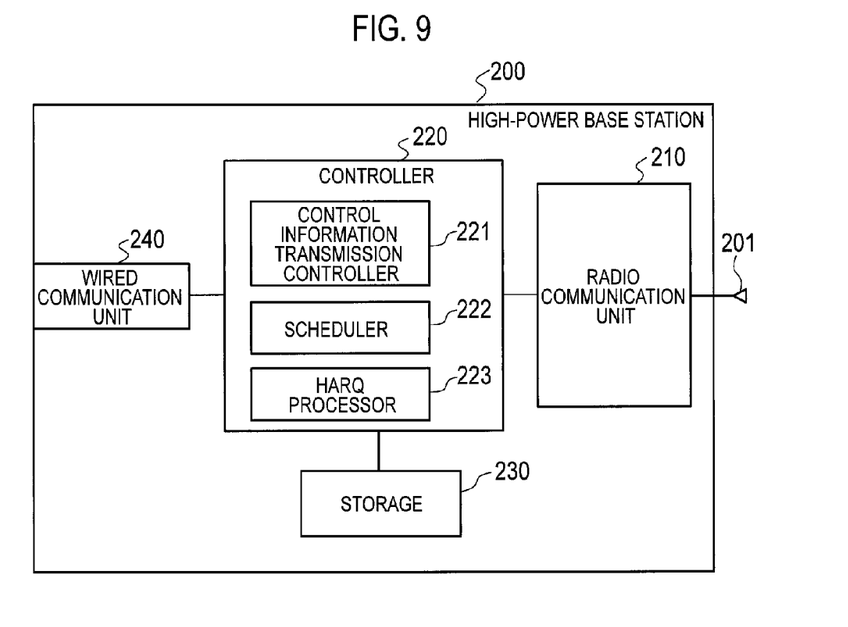
FIG. 9 is a block diagram illustrating the configuration of a high-power base station according to the second embodiment of the invention.

FIG. 9 is a block diagram illustrating the configuration of the high-power base station 200 according to the second embodiment.

As illustrated in FIG. 9, the high-power base station 200 has a scheduler 222 and a HARQ processor 223 in addition to the configuration described in the first embodiment. The scheduler 222 assigns respective radio resources of PUSCH and PDSCH to the radio terminal 300 according to a scheduling algorism such as a proportional fairness algorism after the radio terminal 300 is handed over to the high-power base station 200. The HARQ processor 223 performs retransmission control according to HARQ after the radio terminal 300 is handed over to the high-power base station 200.

Figure 10:
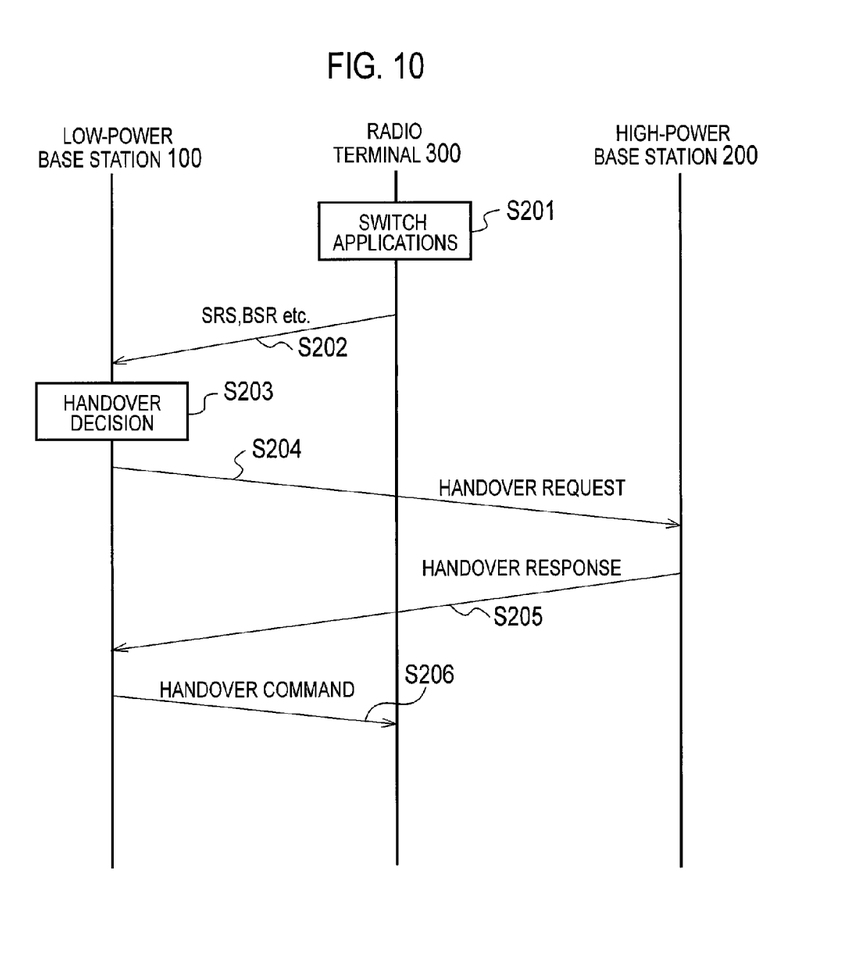
FIG. 10 is a schematic sequence diagram for illustrating an operation of a radio communication system according to the second embodiment of the invention.

Hereinafter, the description is given of the operation of a radio communication system according to the second embodiment. FIG. 10 is a schematic sequence diagram for illustrating an operation of the radio communication system according to the second embodiment. At a stage before step S210 in FIG. 10, it is assumed that the radio terminal 300 sets PDSCH, PUSCH, and PUCCH as low-power base stations 100 and sets PDCCH as a high-power base station 200, and executes a non-real-time application.

At step S201, the application execution unit 324 of the radio terminal 300 switches an application in execution from a non-real-time application to a real-time application.

At step S202, the radio communication unit 310 of the radio terminal 300 transmits an SRS and a BSR to the low-power base station 100. Here, the BSR includes the above-described QoS information. The radio communication unit 110 of the low-power base station 100 receives the SRS and BSR.

At step S203, the handover controller 126 of the low-power base station 100 detects that the application executed in the radio terminal 300 is switched to the real-time application based on the QoS information included in the BSR. For example, when the QoS information is a value indicating a degree of QoS, the switching to the real-time application is detected when the value indicating the degree of QoS exceeds a threshold value. The handover controller 126 determines to execute the handover to the high-power base station 200 when detecting the switching to the real-time application.

At step S204, the wired communication unit 140 of the low-power base station 100 transmits a handover request to the high-power base station 200 via the X2 interface. The high-power base station 200 receives the handover request via the X2 interface. The controller 120 of the high-power base station 200 determines if the radio terminal 300 can be accepted.

At step S205, when it is determined that the radio terminal 300 can be accepted, the wired communication unit 240 of the high-power base station 200 transmits a handover response indicating the determination to the low-power base station 100 via the X2 interface. The low-power base station 100 receives the handover request via the X2 interface.

At step S206, the radio communication unit 110 of the low-power base station 100 transmits a handover command to instruct handover to the radio terminal 300. When the handover command is received, the radio terminal 300 executes the handover.

After the handover, the radio terminal 300 sets PDSCH, PUSCH, PDCCH, and PUCCH as high-power base stations 200 and executes the real-time application.

As described above, according to the second embodiment, among the radio terminals 300 connected to the low-power base station 100 and having difficulty in directly receiving PDCCH from the low-power base station 100, the radio terminal 300 using an application type required to have low RTT is controlled to be connected to the high-power base station 200. This can lower the possibility of deteriorating the application quality of the radio terminal 300.

Note that the low-power base station 100 uses the QoS information included in the BSR as a criterion in the second embodiment. However, when similar QoS information can be acquired from an upper system (specifically, MME Mobility Management Entity) of the low-power base station 100, the QoS information acquired from the MME can be used as a criterion in place of the QoS information included in the BSR.

Modification of Second Embodiment

Although the second embodiment is based on the assumption that the radio terminal 300 has only one connection destination, there is also a possibility that the radio terminal 300 can use multiple radio base stations as connection destinations and can simultaneously perform radio communications with the multiple radio base stations.

In the modification, an application execution unit 324 of the radio terminal 300 is made capable of simultaneously executing multiple applications. When detecting that the radio terminal 300 executes a real-time application and a non-real-time application, a handover controller 126 of the low-power base station 100 performs control to switch a connection destination of the radio terminal 300 which supports the real-time application to the high-power base station 200. In other words, the low-power base station 100 is maintained as being the connection destination of the radio terminal 300 which supports the non-real-time application.

As a result, the resource scheduling with regard to the real-time application is performed by the high-power base station 200 and the resource scheduling with regard to the non-real-time application is performed by the low-power base station 100. Similar to the first embodiment, with regard to the non-real-time application, the high-power base station 200 transmits the control information from the low-power base station 100 to the radio terminal 300 in place of the low-power base station 100.

Third Embodiment

In the above-described embodiments, the high-power base station 200 transmits control information to the radio terminal 300 at the timing designated by the timing designation information received from the low-power base station 100. Also, at the designated timing, the low-power base station 100 transmits downlink user data to the radio terminal 300 or receives uplink user data transmitted from the radio terminal 300, and after specified sub-frames from the designated timing, receives ACK/NACK information of the downlink user data fed back from the radio terminal 300.

As described above, in the above-described embodiments, a timing difference since the low-power base station 100 transmits the control information to the high-power base station 200 until the high-power base station 200 transmits the control information to the radio terminal 300 is determined and designated by the low-power base station 100.

In a third embodiment, a timing difference since the low-power base station 100 transmits control information to the high-power base station 200 until the high-power base station 200 transmits the control information to the radio terminal 300 is determined and designated by the high-power base station 200. In other words, in the third embodiment, a timing determination unit according to the above-described embodiments is provided in the high-power base station 200.

The high-power base station 200 grasps a delay time in an X2 interface with the low-power base station 100 in advance and determines as the timing difference a time obtained by adding a predetermined time to the delay time. Note that, when there is jitter of the delay time in the X2 interface with the low-power base station 100, the high-power base station 200 may periodically measure the delay time and determine the timing difference based on the measured value. Instead, the high-power base station 200 may determine the timing difference based on an upper-limit value (an upper-limit value defined by the specifications) of the delay time in the X2 interface with the low-power base station 100. The high-power base station 200 creates timing designation information indicating the determined timing difference and then notifies a small output base station 100 of the timing designation information.

Fourth Embodiment

In the above-described embodiments, the description is given of a mode where control information from the low-power base station 100 to the radio terminal 300 is transmitted to the radio terminal 300 via the high-power base station 200 under a situation where a communication area coverage of the low-power base station 100 is expanded, so that the radio terminal 300 can preferably receive the control information. Accordingly, the radio terminal 300 is preferentially connectable to the low-power base station 100.

However, with regard to a radio terminal 300 which moves at high speed, and the like, it is preferable that the radio terminal 300 be preferentially connected to a high-power base station 200 because handover is immediately performed even though the radio terminal 300 is connected to the low-power base station 100. For example, assumed is a mode in which even though a radio terminal 300 being connected to a high-power base station 200 and moving at high speed comes closer to a low-power base station 100, the radio terminal 300 remains connected to the high-power base station 200. Such a mode can be achieved by reversing a relationship between the low-power base station 100 and the high-power base station 200 in the above-described embodiments.

Specifically, the high-power base station 200 transmits control information required for uplink radio communications between the radio terminal 300 and the high-power base station 200 to the low-power base station 100 via an X2 interface. The low-power base station 100 transmits the control information received from the high-power base station 200 to the radio terminal 300 via PDCCH or PHICH. The radio terminal 300 transmits the uplink user data to the high-power base station 200 via PUSCH by using the control information received from the low-power base station 100.

Application of such a communication method enables the following communication channel establishment. A physical uplink control channel (PUCCH) in which control information is transmitted and a physical uplink shared channel (PUSCH) in which user data is transmitted are established in an uplink between the radio terminal 300 and the high-power base station 200. A physical downlink shared channel (PDSCH) in which user data is transmitted is established in a downlink between the radio terminal 300 and the high-power base station 200. A physical downlink control channel (PDCCH) in which control information is transmitted and a hybrid automatic repeat request (HARQ) indicator channel (PHICH) are established in a downlink between the radio terminal 300 and the low-power base station 100.

As described above, the radio terminal 300 according to the fourth embodiment transmits/receives uplink/downlink user data to/from the high-power base station 200 via PDSCH and PUSCH, and transmits the control information for controlling the downlink radio communication to the high-power base station 200 via PUCCH, and receives the control information for controlling the uplink radio communication from the low-power base station 100 via PDCCH.

Other Embodiments

As described above, the present invention has been described by using the above-described embodiments. However, it should not be understood that the description and the drawings, which constitute one part of this disclosure, are to limit the present invention. Various alternative embodiments, examples, and operational techniques will be obvious for those who are in the art from this disclosure.

For example, in the above-described embodiments, the description is given of the case where an inter-base station communication is a wired communication. However, an inter-base station communication may be a radio communication.

In the above-described embodiments, the description is given of the case where a low-power base station is a picocell base station (a hot zone base station). However, a low-power base station may be a femtocell base station (a home eNB) whose transmission output power is lower than that of the picocell base station.

In the above-described embodiments, the description is given of the case where the low-power base station 100 is a servicing base station for both uplink and downlink. However, there is a possibility in future that base stations can be separately made serving base stations for uplink and downlink. In such a case, the uplink serving base station may be set as the low-power base station 100 and the downlink serving base station may be set as the high-power base station 200. The present invention is also applicable to the case where base stations are separately set as serving base stations for uplink and downlink.

In the above-described embodiments, although the PL criterion is employed as a selection criterion for a connection destination, the criterion is not limited to the PL criterion but may be any other selection criterion such as RP criterion.

Although it is not particularly mentioned in the above-described embodiments, the antenna unit 101, the antenna unit 201, and the antenna unit 301 may include multiple antennas for executing SIMO (Single Input Multiple Output) or MIMO (Multiple Input Multiple Output) communication.

As described above, it should be understood that the present invention includes various embodiments not described herein. Accordingly, the present invention is only limited by the scope of claims and matters specifying the invention, which are appropriate from this disclosure.

Note that the contents of Japan Patent Application No. 2009-251669 (filed on Nov. 2, 2009) and No. 2010-094500 (filed on Apr. 15, 2010) are hereby incorporated by reference in their entirety.

INDUSTRIAL APPLICABILITY

As described above, a radio communication system, a low-power base station, a high-power base station, a radio terminal, and a radio communication method according to the present invention which enable adequate load balancing among base stations under a heterogeneous deployment, and thus are useful in radio communications of a mobile communication and the like.

The invention claimed is:

1. A radio terminal comprising:
a controller that performs a dual connectivity communication which is a simultaneous communication with a first radio base station and a second radio base station by connecting to the first radio base station and the second radio base station; and
a receiver that receives, from the first radio base station, control information about radio resources of the second radio base station, after starting the dual connectivity communication, wherein
the controller controls a radio communication with the second radio base station, based on the control information received from the first radio base station, in the dual connectivity communication.

2. A processor applied to a radio terminal, executing the processes of:
performing a dual connectivity communication which is a simultaneous communication with a first radio base station and a second radio base station by connecting to the first radio base station and the second radio base station;
receiving, from the first radio base station, control information about radio resources of the second radio base station, after starting the dual connectivity communication; and
controlling a radio communication with the second radio base station, based on the control information received from the first radio base station, in the dual connectivity communication.

3. A first radio base station comprising:
a transmitter that transmits control information about radio resources of a second radio base station, to radio terminal which has started a dual connectivity communication which is a simultaneous communication with the first radio base station and the second radio base station by connecting to the first radio base station and the second radio base station, wherein the control information is used by the radio terminal to control a radio communication with the second radio base station, in the dual connectivity communication.

* * * * *